Inventor
CHARLES W. EARP

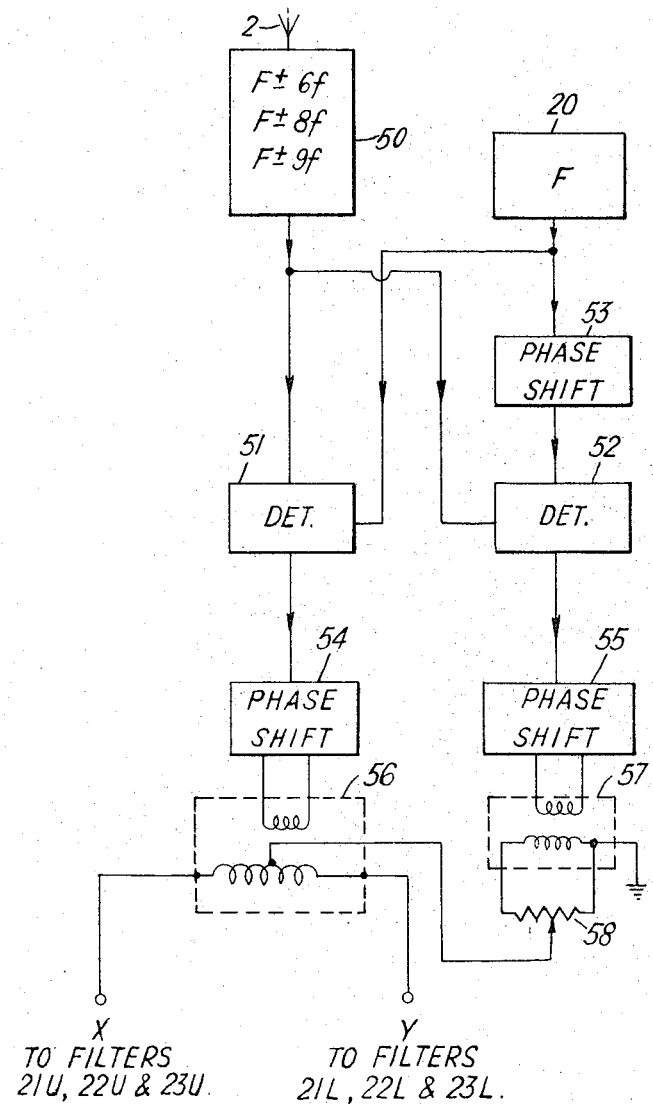

United States Patent Office 3,337,872
Patented Aug. 22, 1967

3,337,872
RADIO NAVIGATION SYSTEM
Charles William Earp, London, England, assignor to International Standard Electric Corporation, New York, N.Y., a corporation of Delaware
Filed Feb. 8, 1965, Ser. No. 430,933
Claims priority, application Great Britain, Feb. 20, 1964, 7,129/64
3 Claims. (Cl. 343—112)

This invention relates to radio navigation systems.

My co-pending applications, Ser. No. 401,440, filed October 5, 1964 and Ser. No. 419,159, filed Dec. 17, 1964, describe radio navigation systems for determining the distance of a mobile object from one or more fixed stations. The distance of the mobile object from each fixed station is determined by a measurement of the phase displacement between each of a pair of waves radiated at different frequencies from the fixed station.

Ser. No. 419,159, shows that the use of waves on closely spaced frequencies radiated as a pair from a fixed station or from each of a number of fixed stations permits the resolution of the ambiguities inherent in a distance measurement using only a single frequency at the fixed station or at each fixed station. The ambiguities are resolved by obtaining at the mobile object one or more low frequency waves representing the beat between one or more pairs of the waves transmitted from the ground stations. The beat frequency wave is used to obtain a coarse but unambiguous indication of the distance of the mobile object from the fixed station.

If the relative phase difference between the waves of a pair of waves radiated from one of the fixed stations suffers a phase error of say, $p$, due to propagation conditions causing a difference in the transit times of the waves between the fixed station and the mobile object, then the phase of the low frequency beat wave will also be in error by $p$. Due to the relatively large distance corresponding to one wavelength of the beat wave, the corresponding error in the indicated distance is magnified.

By the present invention it is aimed to provide a radio navigation system for determining the distance of a mobile object from one or more fixed stations in such a way that the distance measurement is unambiguous and is substantially independent of differences in the transit times of the waves from the fixed stations to the mobile objects, and to provide a receiver to operate in the radio navigation system.

The term "harmonically related frequencies" as used in this specification means frequencies which are integral harmonics of a common frequency.

According to one aspect of the invention there is provided a radio navigation system wherein the distance of a mobile object from a fixed station is represented ambiguously by two waves having harmonically related frequencies which includes means to obtain from the said two waves a wave representative of the relative timing thereof, and means to obtain from the wave representative of the relative timing of the said two waves an unambiguous indication of the distance of the mobile object from the fixed station.

According to a further aspect of the invention there is provided a radio navigation system including a fixed transmitting station, a receiver at a mobile object to receive two waves having harmonically related frequencies from the transmitting station, the said waves being ambiguously representative of the distance of the mobile object from the transmitting station, the said receiver including filter means to separate the said waves from one another, generator means to generate in response to the separate waves two signals having a relative timing dependent upon the relative timing of the two waves, and detector means responsive to the two signals to obtain therefrom a wave having a frequency equal to the frequency difference between the said two waves and a timing unambiguously representative of the distance of the mobile object from the transmitting station.

In one example of a radio navigation system according to the invention the unambiguous wave is obtained from the output of a coincidence gate, to the input of which are applied two trains of pulses having repetition frequencies respectively equal to the frequencies of the two ambiguous waves.

In a second example of a radio navigation system according to the invention the two waves at harmonically related frequencies are each multiplied up to the same frequency, the multiplied waves are phase-compared, the phase of one of the waves is adjusted in accordance with the phase comparison so as to reduce any phase errors between them, and the other of the two waves is beaten with the phase adjusted wave to produce the further wave unambiguously representative of time.

Embodiments of the invention will now be described in conjunction with the accompanying drawings in which:

FIG. 5 is a diagram, partly in block form, of a single sideband demodulator.

Figure 1:
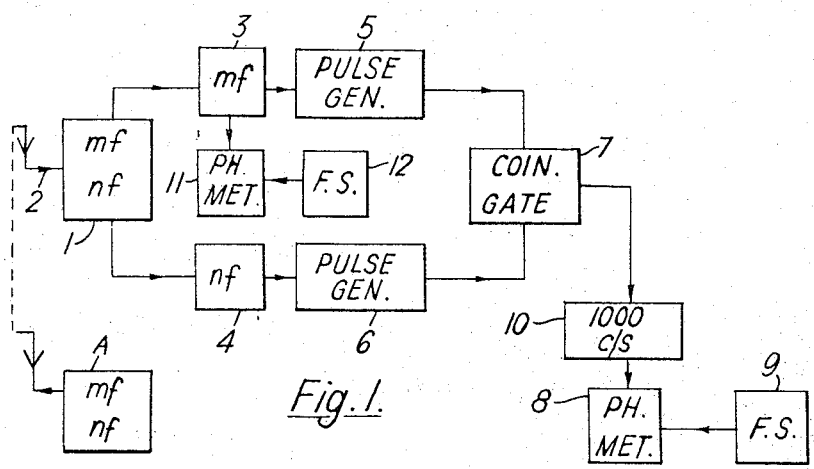
FIG. 1 is a block diagram of a first receiving arrangement for use on a mobile object.

Referring to FIG. 1 the block 1 represents the input stages of the receiver. The input stages are coupled to an aerial 2 and receive two continuous waves of frequencies $mf$ and $nf$ respectively, radiated from a fixed transmitting station A. This transmitter station is of a type well known in the art and a more detailed description thereof is deemed unnecessary for a proper understanding of this invention. In this embodiment of the invention $mf$ is 11 kc./s. and $nf$ is 10 kc./s. The waves at $mf$ and $nf$ are selected by filters 3 and 4, respectively. Two pulse generators 5 and 6 are coupled to the outputs of the filters 3 and 4, respectively, and the outputs of the pulse generators are coupled to the inputs of a coincidence gate 7. A phasemeter 8 has one input coupled to the output of the coincidence gate 7 via a 1000 c./s. filter 10 and another input coupled to a frequency standard 9. A further phasemeter 11 is connected between the output of the filter 3 and the output of a further frequency standard 12. The frequency standards 9 and 12 generate reference waves at frequencies of $(m-n)f$ (i.e. 1000 c./s.) and 11 kc./s., respectively, and have a frequency accuracy of the order of 1 part in $10^{10}$.

Figure 2:
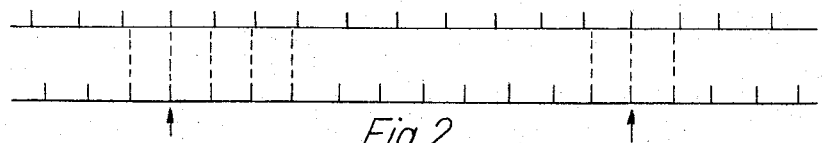
FIG. 2 shows waveforms, illustrating the operation of the first receiving arrangement.

The waves at $mf$ and $nf$ give rise to pulse trains having repetition frequencies $mf$ and $nf$ at the output of the pulse generators 5 and 6, respectively. The pulse train at $mf$ is shown in the lower diagram of FIG. 2, that at $nf$ is shown in the upper diagram of the figure.

The coincidence gate 7 is arranged to produce an output pulse only when two pulses occur at the same time at the input to the gate. Therefore the output pulses from the coincidence gate, indicated by arrows on FIG. 2, have a repetition frequency of $(m-n)f$.

In this embodiment of the invention since $f=1000$ c./s., $m=11$ and $n=10$ the upper train at 10000 c./s. has every tenth pulse coincident with every eleventh pulse of the lower train at 11000 c./s. Thus output pulses from the coincidence gate have a repetition frequency of 1000 c./s.

If the relative timing of the 10 kc./s. and 11 kc./s. frequencies is correctly set at the fixed station then, in the absence of errors occurring in the propagation of the two waves between the ground station and the mobile craft, there will be perfect coincidence between the occurrence of every tenth pulse of the 10 kc./s. train and every eleventh pulse of the 11 kc./s. train. Differential delays in the receiving apparatus on the mobile craft can be balanced out by including an adjustable phase shifter in the path of one or both the waves.

The width of the individual pulses of the 10 kc./s. and 11 kc./s. trains is made equal to $1/20$ of the spacing between the pulses. If errors due to propagation effects cause a relative mistiming between the pulses of the two trains not greater than $1/20$ of the pulse spacing, then the correct coincidence is not lost, neither can false coincidence occur.

The fundamental component of the pulse train from the output of the coincidence gate 7 is selected by the 1000 c./s. filter 10 and is compared in phase with the signal from the frequency standard 9. The phasemeter 8 provides a coarse, but virtually unambiguous indication of the distance of the mobile object from the fixed station. The coarse indication may, for practical purposes, be considered unambiguous because the indications repeat themselves only at distance intervals greater than the wavelength corresponding to $(m-n)f$, i.e. 300 km. If the phase of say, the 10 kc./s. wave, $nf$, is in error by an amount $p$, where $p$ is less than $1/20$ of the spacing between the pulses of the 10 kc./s. train, then the phase error in the 1000 c./s. component compared with the standard in the phase-meter 8 is $p/20$. In the ambiguity resolution system described in my copending application, Ser. No. 418,159, filed Dec. 17, 1964, the corresponding phase error in the beat between the two signals transmitted by the fixed station would be $p$.

"Fine" distance information is provided by the phasemeter 11, the readings of which are ambiguous at distances of the mobile object from the fixed station greater than one wavelength corresponding to the frequency $mf$, i.e. 27.3 km. The "fine" distance information could alternatively have been obtained from the output of the $nf$ filter 4, by comparing the wave at $nf$ from the filter 4 with a wave from a frequency standard at 10 kc./s.

A second embodiment of the invention will now be described with reference to FIG. 3. Blocks which represent stages having the same function as similar stages in FIG. 1 are similarly numbered. The method of obtaining the "fine" distance information is the same as that shown in FIG. 1 and is not shown in FIG. 3.

The frequency of the output wave from the $mf$ filter 3 is multiplied by a factor "$n$" in a multiplier 14. The frequency of the output wave from the $nf$ filter 4 after passing through a phase adjuster 17 is multiplied by a factor "$m$" in a multiplier 15. The waves from the outputs of the multipliers 14 and 15, each having a frequency $mnf$, are applied to separate inputs of a phase comparator in the form of a phase resolver 16. A signal from the phase resolver 16 is fed to the phase adjuster 17 which controls the phase of the output wave from the $nf$ filter 4 before it is fed to the multiplier 15. In addition to a connection between the output of the phase adjuster 17 and the multiplier 15 there is a connection from the output of the phase adjuster 17 to the input of an amplitude detector 18. The output of the $mf$ filter 3 is also connected to the input of the detector 18. The phasemeter 8 is connected between the output of the detector 18 and the 1000 c./s. frequency standard 9 via the 1000 c./s. filter 10.

As in the previous embodiment of the invention the waves at $mf$ and $nf$ received by the aerial 2 are fed to the input stages 2 of the receiver and are selected by filters 3 and 4.

The waves from the outputs of the multipliers 14 and 15 are each at a frequency of 110 kc./s. and the phase resolver 16 detects a departure of the phase relationship between the two signals from a predetermined amount and controls the phase adjuster 17 to restore balance.

The wave from the output of the $mf$ filter 3 and the phase adjuster wave at $nf$ are beaten together in the amplitude detector 18 to yield a sinusoidal component at the frequency $(m-n)f$, i.e. 1000 c./s., which is selected by the filter 10. The phase-meter 8 again provides a "coarse" but unambiguous distance measurement.

If the phase of say, the $mf$ wave is in error by an amount $p$ at the input to the receiver, then the phase error at the input of the phase resolver 16 will be $np$. It will be assumed that the phase of the $nf$ wave is correct. The phase of the $nf$ wave is then adjusted by the adjuster 17 by an amount $k$ such that the correct predetermined phase relationship between the two signals at $mnf$ at the phase resolver 16 is obtained.

Under this condition $mk=np$ and $k=n/m$.

The differential error between the waves applied to the amplitude detector 18 is therefore $$p - \frac{n}{m}p = p\left(1 - \frac{n}{m}\right)$$
$$= p\left(1 - \frac{10}{11}\right)$$
$$= 0.1\ p \text{ approximately.}$$

If the phase error between the two waves at $mnf$ is greater than 180 degrees the ambiguity will not be correctly resolved.

In both these embodiments of the invention the fixed transmitting station is merely required to radiate continuous waves at the two frequencies $mf$ and $nf$ simultaneously. The apparatus at the transmitting station can be of any known type and is not shown in detail. The waves at $mf$ and $nf$ can for example be generated by selecting the appropriate harmonics of a highly stable oscillator having a frequency $f$.

In the two embodiments described above apparatus for the determination of the distance of a mobile object from a fixed station has been described. If the position of the mobile object is required, rather than its range from the fixed station, the apparatus shown in either FIG. 1 or FIG. 3 may be triplicated and used to receive three pairs of harmonically related frequencies, each pair being radiated from one of three fixed stations.

The known OMEGA radio navigation system, for example, includes a number of ground stations which radiate on a time-sharing basis a number of waves having the same single frequency. This system is described on pages 142–144 of "Radio Navigation Systems" by W. Bauss. If the time-shared transmission of the same single frequency radiated from each of the three ground stations is replaced by twin frequencies at $mf$ and $nf$, the circuits of FIG. 1 or FIG. 3 may be triplicated to yield 3 outputs at $(m-n)f$ derived from the three waves received from the ground stations. A "coarse" but unambiguous measurement of the differential distance between the mobile object and any two of the fixed stations is measured as the phase difference between the corresponding outputs at $(m-n)f$.

Figure 3:
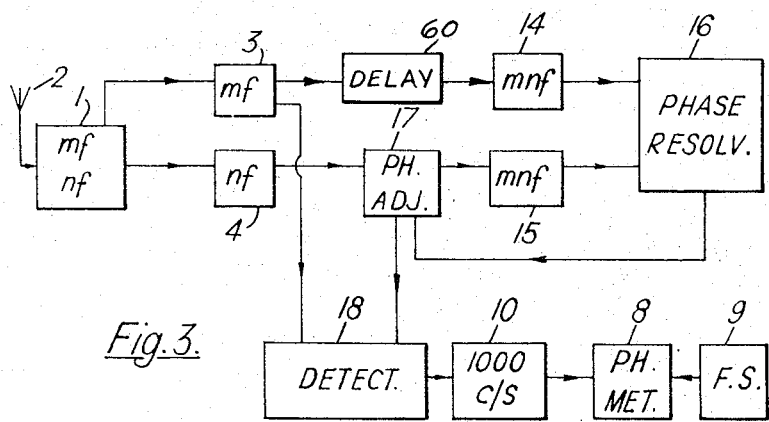
FIG. 3 is a block diagram of a second receiving arrangement for use on a mobile object.

In a V.L.F. navigation system such as Omega, when two harmonically related frequencies are radiated from each ground station for provision of lane identification, the different propagation velocities of the two waves may be such that, at long ranges, the circuits of FIGS. 1 and 3 do not permit correct alignment of "coarse" and "fine" lanes, as different transit times of the two waves may be considerable.

However, knowledge of propagation is such that differential transit times can be predicted with an accuracy of several microseconds. Hence, a manual phase adjustment can be made on one (or each) of the two waves in the receiver before using the automatic alignment achieved in FIGS. 1 and 3.

In FIG. 1 the manual phase adjustment could be introduced by a calibrated phase control introduced between blocks 4 and 6.

In FIG. 3 such a control could be introduced between blocks 4 and 17 or between blocks 3 and 14.

Assuming the use of the frequencies 10 and 11 kc./sec., the 1000 c./s. beat can be produced with correct alignment of phase with respect to 10 kc./s. or 11 kc./s., without ambiguity, so long as the differential propagation time is known with a precision of half a period of 110 kc./s., which is about 4½ μsec.

Now, it is an important feature of the invention, that the phase of the beat frequency, (in this case 1000 c./s.) should be correctly aligned to the chosen radio frequency (say 10 kc./s.) corresponding to one ground station, before comparing that phase with a similar beat derived from another ground station.

Thus the differential propagation times of the two waves from each station need only, in this case, be known to within ±4½ μsec. If, on the other hand, uncorrected beats at 1000 c./s. from two separate ground stations were compared, the maximum reliable correction being ±4½ μsec., permissible errors on signals from individual ground stations would be reduced to ±2¼ microseconds.

Hence, individual corrections of the phase of the beats must permit a considerably improved reliability of lane identification.

An embodiment of the invention in the form of a further hyperbolic radio navigation system will now be described. Fixed transmitting stations A, B and C (illustrated in block form in FIGURE 4) at suitably spaced locations on the ground radiate pairs of sidebands, of which the carrier wave, F, is not radiated. The ground stations radiate sidebands as follows:

Ground station A, $F \pm 6f$
Ground station B, $F \pm 8f$
Ground station C, $F \pm 9f$ The sidebands are produced by amplitude modulation of a carrier wave in a conventional balanced (i.e. carrier suppression) modulator by signals of 6f, 8f and 9f, respectively, at each of the ground stations. Since the apparatus at the transmitting station is of a conventional type it will not be described further. The values of F and f depend upon the required range of the system. In this embodiment of the invention, which is in a very long range system, a typical value for F is 10 kc./s., and for f, 3 c./s. In systems having shorter ranges it is convenient to use higher values for F, up to, say, 2 mc./s. with a correspondingly higher frequency for f. The frequencies $F \pm 6f$ are harmonically related, as are $F \pm 8f$ and $F \pm 9f$.

Figure 4:
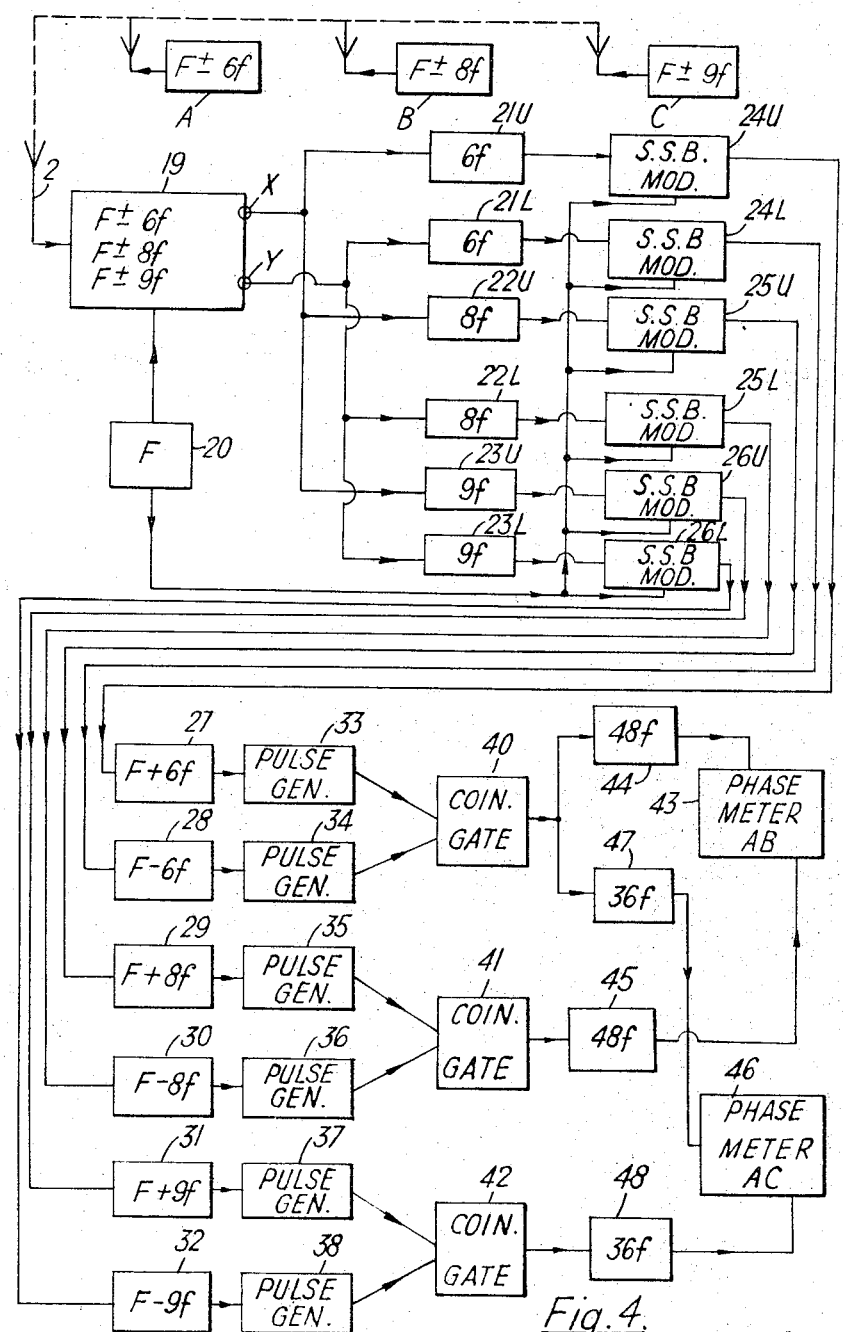
FIG. 4 is a block diagram of a third receiving arrangement for use on a mobile object and a transmitting arrangement therefor.

The receiving arrangements on the mobile object will now be described. Referring to FIG. 4 there is shown connected to the receiving aerial 2 a single sideband demodulator 19, which will be described later. The demodulator 19 is energized by a carrier wave oscillator 20. Three pairs of demodulated waves are obtained at output terminals X and Y of the single sideband demodulator. The demodulated waves from the terminal X are fed to filters 21U, 22U and 23U, tuned to 6f, 8f and 9f, respectively. The demodulated waves from the terminal Y are fed to filters 21L, 22L and 23L, also tuned to 6f, 8f and 9f, respectively. Filters 21U and 21L, 22U and 22L, 23U and 23L, thus constitute three pairs tuned to 6f, 8f and 9f, respectively.

The outputs of the filters are respectively connected to the signal inputs of three pairs of single sideband modulators 24U and 24L, 25U and 25L, 26U and 26L, each of which is also connected to the local carrier wave oscillator 20.

The outputs of the single sideband modulators 24U, 25U and 26U are respectively connected to filters 27, 29 and 31, tuned to the upper sideband frequencies of the ground stations. The outputs of the single sideband modulators 24L, 25L and 26L are respectively connected to filters 28, 30 and 32, tuned to the lower sideband frequencies of the ground stations.

The outputs of the filters 27 to 32 are connected to pulse generators 33 to 38. The pulse generators are all similar and are arranged to produce trains of equally spaced pulses having repetition frequencies equal to the frequencies of sinusoidal waves fed to their inputs from the filters 27 to 32.

The pulse generators 33 to 38 are grouped in pairs, each of which feeds one of three coincidence gates 40, 41 and 42. The arrangement of the connections between the pairs of filters 21U to 23L, the single sideband modulators 24U to 26L, the filters 27 to 32, the pulse generators 33 to 38, and the coincidence gates 40 to 42 is shown in tabular form below:

| Filter Frequency | Connected to S.S.b. mod. | Connected to filter | Frequency | Connected to pulse generator | Connected to gate |
|---|---|---|---|---|---|
| 21U 6f | 24U | 27 | F+6f | 33 | 40 |
| 21L 6f | 24L | 28 | F−6f | 34 | 40 |
| 22U 8f | 25U | 29 | F+8f | 35 | 41 |
| 22L 8f | 25L | 30 | F−8f | 36 | 41 |
| 23U 9f | 26U | 31 | F+9f | 37 | 42 |
| 23L 9f | 26L | 32 | F−9f | 38 | 42 |

The outputs of the gates 40 and 41 are connected to a phasemeter 43 through filters 44 and 45, respectively, which are both tuned to 48f.

The outputs of the gates 40 and 42 are connected to a phasemeter 46 through filters 47 and 48, respectively, which are both tuned to 36f.

The operation of the receiving arrangements at the mobile object will now be described. The sidebands at $F \pm 6f$, $F + 8f$ and $F \pm 9f$ received by the aerial 2 are demodulated in the single sideband demodulator 19 in the input stages by the locally generated carrier wave from the oscillator 20, which has a frequency F.

Oscillator 20 is synchronized with the input carrier frequency by means of any technique well known in the art and a more detailed description thereof is deemed unnecessary for an understanding of the instant invention. For example, one well known technique which would satisfactorily maintain synchronization of the system is the use of highly stable carrier frequency sources.

The output waves of the single sideband demodulator, at terminals X and Y include three pairs of waves at 6f, 8f and 9f. The phases of the waves at terminals X and Y are representative of the phases of the upper and lower sidebands transmitted by the ground stations. Thus, for example, the 6f wave at X represents the upper sideband, $F+6f$, transmitted from the ground station A, while the 6f wave at Y represents the lower sideband, $F−6f$, transmitted from the ground station A.

The pair of waves at 8f represents the upper and lower sidebands, $F \pm 8f$, transmitted from the ground station B. The pair of waves at 9f represents the upper and lower sidebands transmitted from the ground station C.

As the mobile object moves towards or away from any one of the ground stations A, B or C each of the sectors representing the sideband at $F \pm 6f$, $F+8f$, or $F+9f$, as the case may be, rotates through 180 degrees with respect to the vector representing the local carrier wave from the oscillator 20 over a distance corresponding to one half-wavelength of the radiated sideband. The relative angular displacements between the vectors representing the signals at 6f, 8f or 9f is therefore very closely 360 degrees per half wavelength of each of the transmitted sidebands.

Each pair of waves at 6f, 8f or 9f represents ambiguously the distance of the mobile object from one of the ground stations. As this embodiment of the invention is concerned with a hyperbolic radio navigation system it is the difference between the distances of the mobile object from each pair of the ground stations that is required, not the absolute distance of the mobile object from any one of the stations. As a result, the stability of the carrier wave oscillator 20 need not be so high as when absolute distance measurements are required since phase errors due to any instability tend to cancel.

Fine but ambiguous information of the differential distance between the mobile object and each pair of the ground stations can be obtained by a phase comparison between the signals from the outputs of the respective pairs of filters 21U and 21L, 22U and 22L, and 23U and 23L. The rest of the operation of the arrangements at the mobile object concerned with obtaining an unambiguous indication of the position of the mobile craft will now be described.

In the single sideband modulators 24U to 26L the low frequency waves at 6f, 8f and 9f are heterodyned back to the original transmitted frequencies of $F+6f$, $F-6f$, $F+8f$, $F-8f$, $F+9f$ and $F-9f$. Each one of these six frequencies is selected by one of the filters 27 to 32. The reason for using the arrangement described instead of directly applying the received signals to the filters 27 to 32 is to avoid the possibility of spurious phase shift occurring in filters having a sufficiently sharply defined selectivity to discriminate between the received sideband signals. In the arrangement used in the embodiment of the invention separation of the components bearing the upper and lower sideband information is effected in the single sideband demodulator 19 and the low frequency filters 21U to 23L. Therefore the filters 27 to 32 need not have a sharp selectivity characteristic.

The pulse generators 33 and 34 respectively produce trains of pulses having repetition frequencies of $F+6f$ and $F-6f$. A pulse train at a frequency of $$F+6f-(F-6f)$$

i.e. 12f, is obtained from the output of the coincidence gate 40 to which the two pulse trains are applied. In a corresponding manner pulse trains at 16f and 18f are obtained from the coincidence gates 41 and 42. Two waves at 48f are extracted from the pulse trains at 12f and 16f in the filters 44 and 45. The respective phases of these waves at 48f are dependent upon the time positions of the pulse trains from which they are derived. The two waves of 48f are phase-compared in the phasemeter 43, which provides an unambiguous indication of the differential distance between the mobile object and the ground stations A and B.

Two waves at a frequency of 36f are extracted in the filters 47 and 48 from the pulse trains at 12f and 18f respectively. The two waves at 36f are phase-compared in the phase-meter 46 to provide an unambiguous indication of the differential distance between the mobile object and each of the ground stations A and C.

The position of the mobile object can be determined from the two differential distances by using known techniques.

In the event that the phase error between the sidebands of a pair is such that coincidence between pairs of pulses in the coincidence gates is lost, the ambiguity will be incorrectly resolved.

Referring to FIGURE 5, the single sideband demodulator 19 will now be described. The receiving aerial 2 is connected to input circuits 50 which have a pass-band wide enough to accept the signals at $F\pm6f$, $F\pm8f$ and $F\pm9f$. An amplitude detector 51 is connected to the output of the input circuits 50 and to output of the local carrier wave oscillator 20. The output of the input circuits 50 is also connected to a further amplitude detector 52. The output of the carrier wave oscillator 20 is connected to the amplitude detector 52 through a 90 degree phase-shift network 53. The outputs of the detectors 51 and 52 are connected through complementary phase-shift networks 54 and 55 to the primary windings of transformers 56 and 57 respectively. A potentiometer 58, used for gain equalization, is connected across the secondary winding of the transformer 57. One side of this secondary winding is coupled to ground potential and the variable tap of the potentiometer is connected to a center tap on the secondary winding of the transformer 56.

The output from the carrier wave oscillator 20 is beaten with the received sidebands in the amplitude detector 51 and, after a phase shift of 90 degrees, in the amplitude detector 52.

From the output of the amplitude detector circuit 51 signals at 6f, 8f and 9f are obtained. The amplitude of each of these signals varies in dependence upon the angle between the resultant of the vectors representing the corresponding pair of received sidebands (at $F\pm6f$, $F+8f$ and $F+9f$) and the vector representing the carrier wave from the source 20. The amplitude of each of the signals at 6f, 8f and 9f has a maximum value when the resultant of the corresponding sideband vectors is in line with the carrier vector.

In a normal amplitude modulated signal the vectors representing the sideband signals have a resultant which is always in line with the carrier vector. In the present invention the resultant of the vectors representing the sideband signals received at the mobile object are not necessarily in line with the vector representing the local carrier wave from the oscillator 20. In general there is an angular displacement between the resultant of each pair of sideband vectors and the carrier vector which is dependent partly upon the distance of the receiver from the corresponding ground transmitter and partly upon phase errors due to frequency variations of the oscillator 20. Phase errors due to oscillator frequency variations affect the distance measurements from all the fixed stations equally, and it is not necessary for the oscillator 20 to be a frequency standard.

Similar signals at 6f, 8f and 9f are obtained from the output of the detector circuits 52, but, since the local carrier wave phase has been shifted by 90 degrees, each of the signals is of maximum amplitude when the resultant of the corresponding pair of side-band vectors is in quadrature with the carrier vector.

The signals at 6f, 8f and 9f from the output of the amplitude detector circuit 51 are shifted in phase by 90 degrees relative to the phase of the corresponding signals from the output of the amplitude detector circuit 52 by means of the complementary phase shift networks 54 and 55 which maintain the 90 degree phase difference at each of the frequencies 6f, 8f and 9f.

The signals at 6f, 8f and 9f at the primary winding of the transformer 56 induce anti-phase signal voltages across the two halves of the secondary winding of the transformer. To the signal voltages induced in the respective halves of the secondary winding of the transformer 56 is added the signal voltages from the secondary winding of the transformer 57, to produce sum and difference voltages between the outer terminals of the secondary winding of the transformer 56 and ground.

The phase difference between the two secondary voltages is dependent upon the relative magnitudes of the signals applied to the primary windings of the transformers 56 and 57, being 180 degrees when the signal at the primary winding of the transformer 57 is zero, and zero when the signal at the primary winding of the transformer 56 is zero.

In exactly the same way signal voltages at $6f$, $8f$ and $9f$ are produced between the outer terminals of the secondary winding of the transformer 57 and ground.

The signals $6f$, $8f$ and $9f$ at terminal X of the secondary winding of the transformer 56 are fed to filters 21U, 22U and 23U and are representative of the upper sidebands transmitted by the ground stations A, B and C respectively.

The signals at $6f$ from the output of the filters 21U and 21L differ in phase by an amount which is equal to the differential angular displacement between the vectors representing the received sidebands at $F\pm 6f$ and the locally generated carrier wave vector. At the ground transmitter radiating the sidebands $F\pm 6f$ the resultant of the sideband vector is in line with the vectors representing the suppressed carrier wave. At a distance from the transmitter the vectors representing the received sidebands are each displaced angularly with respect to the carrier vector in opposite directions to one another. The amount of the displacement depends upon the distance of the distant point from the ground transmitter in terms of the wavelengths of the radiated sidebands. Since the frequency $6f$ is only a very small fraction of the carrier frequency F, the angular displacements of the sideband vectors are approximately equal and, since they are in opposite directions, the relative angular displacement between the two sideband vectors is approximately twice the angular displacement of any one sideband vector with respect to the carrier wave.

Exactly the same considerations apply to the relationship between the phase difference between the signals at $8f$ and $9f$ from the filters 22U and 22L, respectively, and the sidebands at $9\pm 8f$ and $F\pm 9f$.

The signals at $6f$, $8f$ and $9f$ at terminal Y of the secondary winding of the transformer 56 are representative of the respective lower sidebands transmitted from the ground stations and are fed to the filters 21L, 22L and 23L.

It is to be understood that the foregoing description of specific examples of this invention is not to be considered as a limitation on its scope.

What I claim is:
1. A radio navigation system including a fixed transmitting station including means for transmitting two waves having harmonically related frequencies and a receiver at a mobile object, said receiver including:
   means for receiving said two waves, said waves being ambiguously representative of the distance of the mobile object from said transmitting station;
   filter means coupled to said receiving means for separating said waves from one another;
   means coupled to said filter means including two frequency multipliers for multiplying the respective waves by a factor such that the frequencies of the multiplied signals are substantially the same;
   a phase adjuster coupled to one of said multipliers;
   a phase resolver coupled to the output of said phase adjuster and to the other of said multipliers, the output of said phase resolver being coupled back to said phase adjuster for varying the phase shift thereof;
   a detector coupled to the output of said phase adjuster and to the output of said other multiplier;
   a filter tuned to the frequency difference between said two received waves coupled to the output of said amplitude detector; and
   phase measuring means coupled to the output of said filter.

2. A radio navigation system according to claim 1 wherein said phase measuring means includes:
   a frequency standard which generates a reference wave at a frequency equal to the frequency difference between said two received waves; and
   a phase-meter coupled to said frequency standard and to said filter means for measuring the phase difference between the output of said frequency standard and the output of said filter, said phase difference being representative of the distance between said transmitting station and said mobile object.

3. A radio navigation system as claimed in claim 1 including a manually operable phase adjuster coupled between said filter means and at least one of said multiplying means.

References Cited
UNITED STATES PATENTS

| | | | |
|---|---|---|---|
| 2,530,902 | 11/1950 | O'Brien | 343—105 |
| 2,934,820 | 2/1960 | Dishal et al. | |
| 2,947,985 | 2/1960 | Cooley | 343—105 |
| 3,045,234 | 7/1962 | Sandretto. | |
| 3,270,343 | 8/1966 | Bridges | 343—105 |

FOREIGN PATENTS

| | | |
|---|---|---|
| 683,688 | 12/1952 | Great Britain. |

RODNEY D. BENNETT, *Primary Examiner.*

CHESTER L. JUSTUS, *Examiner.*

D. C. KAUFMAN, *Assistant Examiner.*